United States Patent
Shenker et al.

(10) Patent No.: US 10,791,460 B2
(45) Date of Patent: Sep. 29, 2020

(54) TERMINAL TYPE IDENTIFICATION IN INTERACTION PROCESSING

(71) Applicant: Visa International Service Association, San Francisco, CA (US)

(72) Inventors: Gavin Shenker, Los Angeles, CA (US); Brian Sullivan, Buckinghamshire (GB); Christian Aabye, Redwood City, CA (US); Hao Ngo, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/262,699

(22) Filed: Jan. 30, 2019

(65) Prior Publication Data
US 2020/0245138 A1    Jul. 30, 2020

(51) Int. Cl.
*H04W 12/00* (2009.01)
*H04W 4/02* (2018.01)
*H04W 12/06* (2009.01)
*G06F 21/32* (2013.01)
*H04W 4/24* (2018.01)

(52) U.S. Cl.
CPC ........ *H04W 12/0023* (2019.01); *G06F 21/32* (2013.01); *H04W 4/023* (2013.01); *H04W 4/24* (2013.01); *H04W 12/06* (2013.01)

(58) Field of Classification Search
CPC ... H04W 12/0023; H04W 4/023; H04W 4/24; H04W 12/06; G06F 21/32
See application file for complete search history.

(56) References Cited

U.S. PATENT DOCUMENTS

| 9,972,005 | B2 | 5/2018 | Wong et al. |
| 2008/0129450 | A1 | 6/2008 | Riegebauer |
| 2008/0306849 | A1* | 12/2008 | Johnson, Jr. ............. G07F 7/12 705/35 |
| 2012/0109764 | A1* | 5/2012 | Martin ................. G06Q 20/204 705/17 |

(Continued)

FOREIGN PATENT DOCUMENTS

KR    20120101214    9/2012

OTHER PUBLICATIONS

PCT/US2020/015272, "International Search Report and Written Opinion", dated Jun. 10, 2020, 13 pages.

*Primary Examiner* — Mehmood B. Khan
(74) *Attorney, Agent, or Firm* — Kilpatrick Townsend & Stockton LLP

(57) ABSTRACT

A method is disclosed. The method includes receiving, by a user device from an access device, an available applications request message. The available applications request message includes an access device type identifier. The method also includes determining whether an association exists between the access device type identifier and one or more application identifiers of a plurality of application identifiers stored on the user device. The plurality of application identifiers respectively correspond to different applications on the user device. The method also includes transmitting, by the user device, to the access device, based in part on whether the association exists, an available applications response. The available applications response includes the one or more application identifiers of the plurality of application identifiers associated with the access device type identifier.

22 Claims, 9 Drawing Sheets

(56) References Cited

U.S. PATENT DOCUMENTS

| | | | |
|---|---|---|---|
| 2013/0060618 A1* | 3/2013 | Barton | G06Q 20/3223 705/14.23 |
| 2014/0108263 A1* | 4/2014 | Ortiz | G06Q 20/3223 705/71 |
| 2015/0186864 A1* | 7/2015 | Jones | G06Q 20/405 705/39 |
| 2015/0327071 A1* | 11/2015 | Sharma | H04L 63/102 726/6 |
| 2016/0019536 A1* | 1/2016 | Ortiz | G06Q 20/3227 705/67 |
| 2016/0055480 A1* | 2/2016 | Shah | G06Q 20/3227 705/21 |
| 2016/0182543 A1* | 6/2016 | Aabye | H04L 63/1416 726/5 |
| 2016/0248479 A1* | 8/2016 | Bellenger | H04W 4/80 |
| 2017/0017951 A1* | 1/2017 | Lee | G06Q 30/0207 |
| 2018/0144334 A1* | 5/2018 | Fontaine | G06Q 20/34 |
| 2019/0172037 A1* | 6/2019 | O'Donoghue | G06Q 20/3227 |

\* cited by examiner

TERMINAL TYPE IDENTIFICATION IN INTERACTION PROCESSING

CROSS-REFERENCE TO RELATED APPLICATIONS

None.

BACKGROUND

Systems and methods for processing transactions between user devices and access devices are known. For example, in the case of a payment transaction, a consumer may use a user device (e.g., payment card or digital wallet application on a smartphone device) to execute a contactless (or contact) data exchange with an access device (e.g., a Point-of-Sale (POS) terminal). In another example, a user device may be used to execute data exchange with an access device (e.g., smartcard reader) to allow a user to access to a building and/or event. In these examples, data is communicated or exchanged between the user device and the access device.

A number of problems, however, exist with existing systems and methods for processing transactions. For example, in the case where a user device is a smartphone, the user device may indiscriminately prompt the user to enter their credentials whenever the user device is used to conduct any type of transaction (e.g., payment or non-payment). However, for some transaction types, additional processing such as user prompts may not be necessary or may even degrade the transaction experience. For example, in a transit transaction, a user may tap his or her phone against a terminal with a turnstile to gain access to a secure area in a transit station. Each patron of the transit station needs to move past the turnstile quickly. In this environment, it is cumbersome and in many cases unnecessary for the user to enter their credentials into their user device before allowing the user to enter the restricted area.

Another problem exists when a user may maintain multiple applications on their user device. In this situation, each application is capable of executing a different type of transaction. When the user device is proximate to an access device, an application (e.g., a digital wallet application) on the user device may transmit to the access device a list of the applications associated with a digital wallet on the user device. However, the user may want to use a specific application when encountering a specific access device type (e.g., using a specific credit card for payment at a particular retailer where the user has a loyalty account, or using a specific mass transit application corresponding to a prepaid card to pass through a train terminal gate, instead of always using a default credit card). The user may want to be able to do this without physically interacting with their user device to select the appropriate application at the time of the transaction.

Embodiments of the disclosure address these and other problems, individually and collectively.

SUMMARY

One embodiment includes a method comprising: receiving, by a user device from an access device, an available applications request message, wherein the available applications request message comprises an access device type identifier; determining, by the user device, whether an association exists between the access device type identifier and one or more application identifiers of a plurality of application identifiers stored on the user device, wherein the plurality of application identifiers respectively correspond to different applications on the user device; and transmitting, by the user device to the access device, based in part on whether the association exists, an available applications response, the available applications response comprising the one or more application identifiers of the plurality of application identifiers associated with the access device type identifier.

Another embodiment includes a communication device comprising: a processor; and a computer readable medium, coupled to the processor. The computer readable medium comprises code, executable by the processor, for implementing a method. The method comprises: receiving from an access device, an available applications request message, wherein the available applications request message comprises an access device type identifier; determining whether an association exists between the access device type identifier and one or more application identifiers of a plurality of application identifiers stored on the user device, wherein the plurality of application identifiers respectively correspond to different applications on the user device; and transmitting to the access device, based in part on whether the association exists, an available applications response, the available applications response comprising the one or more application identifiers of the plurality of application identifiers associated with the access device type identifier.

Another embodiment includes a method comprising: generating, by an access device, an available applications request message, wherein the available applications request message comprises an access device type identifier; transmitting, by the access device, the available applications request message to a user device; and receiving, by the access device from the user device, an available applications response, the available applications response comprising one or more application identifiers associated with the access device type identifier.

Another embodiment includes a method comprising: receiving, by a user device from an access device, an available applications request message, wherein the available applications request message comprises an access device type identifier; and determining, by the user device, based in part on the access device type identifier, whether user interaction on the user device is necessary.

Further details regarding embodiments of the disclosure are described in the Detailed Description and the Figures.

DETAILED DESCRIPTION

Figure 1:
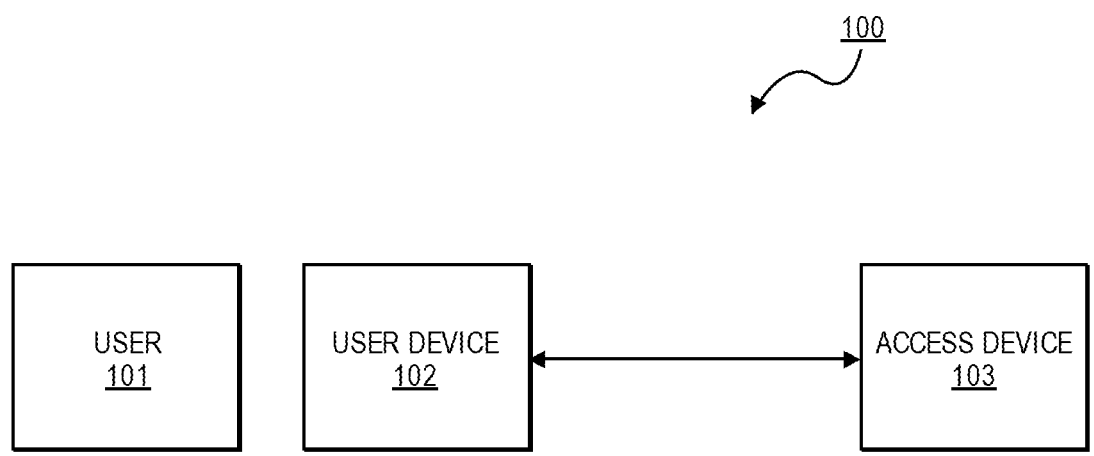
FIG. 1 shows a block diagram of a system according to an embodiment.

Embodiments can include methods and systems that can facilitate processing transactions between a user device (e.g., a mobile phone, contact/contactless card) and an access device (e.g., POS terminal, transit or event gate, smartcard reader, etc.). The messages that are exchanged between a user device and an access device during a transaction can be dependent on features (e.g., software and/or hardware features) of both the user device and the access device. For example, an access device may be configured to send a message that includes an access device type identifier to the user device when the access device detects that the user device is proximate to it. The access device identifier identifies the type of access device (e.g., a mass transit smartcard reader, a specific retailer's point-of-sale (POS) terminal, a baseball stadium electronic ticket reader, etc.) to the user device.

The user device may receive the message from the access device and the message may include the access device type identifier. The user device may associate the access device type identifier with one or more application identifiers (each application identifier respectively corresponding to a different application) on the user device. Based on this association, the user device may send a response message to the access device containing the one or more application identifiers associated with the access device type identifier.

Illustratively, if a user device receives a message containing a mass transit terminal identifier from a transit terminal, the user device may transmit only application identifiers corresponding to a transit specific application and/or a payment application chosen by the user to be used specifically for transit transactions to the transit terminal. This is more efficient than the user device transmitting a generic list of application identifiers on the user device to the transit terminal. By reducing the unnecessary data that might otherwise be transmitted from the user device to the transit terminal, processing speed can improve and the need for extra computing resources (e.g., additional memory and processor power) is reduced. Also, by transmitting a specific list of application identifiers to the transit terminal, this can avoid the need for the transit terminal to choose one of many applications and possibly choosing an application not necessarily preferred by the user.

Additionally, the user device may also be configured to determine, based in part on the access device type identifier received from the access device, whether or not to perform certain functions on the user device. For example, depending upon the value of the access device type identifier, a user device may or may not prompt a user to input verification information such as a biometric sample, passcode or PIN. This can make processing more efficient, since the user device need not request such information from the user in all types of transactions.

Embodiments improve upon conventional systems and offer several technical advantages. As explained above, embodiments save the user time by reducing or eliminating the need for the user to interact with his or her user device to conduct a transaction under certain circumstances. Also, the user device can also automatically select one or more appropriate applications based upon a terminal type. This decreases the risk of human error to ensure that any desired transaction is proceeding in an efficient manner and with the user desired application.

It should be noted that this improvement may also similarly apply to user devices such as contact and/or contactless cards. For example, a card may contain a plurality of applications (e.g., credit card, debit card, etc.), and each application may correspond to one or more of a plurality of access device types. A user may safely and conveniently use a single card to execute a variety of transaction types, with the appropriate application(s) on the card being automatically presented to a particular access device type. This provides increased security and convenience, since a user needs to hold fewer user devices to conduct a wider variety of transactions.

Lastly, embodiments also enable a user device to perform or not perform functions based on the type of transaction being performed. For example, a user device may execute a transaction with the appropriate level of security and/or convenience (e.g., speed) for a particular type of transaction. In a non-payment transaction, such as when the user is tapping their user device against a mass transit terminal card reader at a turnstile, the user device may not prompt the user for a PIN, password, or biometric so that the transaction can proceed without being impeded by a user authentication process. However, in a payment transaction at a retailer's POS terminal, higher security may be desired, and the user device may authenticate the user prior to allowing the user device to complete a transaction with the POS terminal.

Prior to discussing the details of some embodiments of the present disclosure, description of some terms may be helpful in understanding the various embodiments.

A "user device" may be any suitable device that can be used by a user (e.g., a payment card or mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth low-energy (BLE), Wi-Fi, iBeacon, etc.

An "access device" may be any suitable device for providing access to something. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, transit or event gates, access systems, websites, and the like. An access device may use any suitable contact or contactless mode of operation to send or receive data from, or associated with, a user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device.

A "resource provider" can be an entity that provides resources (e.g., goods, services, access to secure data, access to locations, or the like) during a transaction. For example, a resource providing entity can be a merchant, a transit or venue operator, a building owner, a governmental entity, etc. A "merchant" may typically be an entity that engages in transactions and can sell goods or services, or provide access to goods or services.

"Authentication data" may include any data suitable for authenticating an entity. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access request" may include a request for access to a resource. The resource may be a physical resource (e.g., good), digital resources (e.g., electronic document, electronic data, etc.), or services. In some cases, an access request may be submitted by transmission of an access request message that includes access request data. Typically a device associated with a requestor may transmit the access request message to a device associated with a resource provider.

"Access request data" may include any information surrounding or related to an access request. Access request data may include access data. Access request data may include information useful for processing and/or verifying the access request. For example, access request data may include details associated with entities (e.g., resource provider computer, processing server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "service provider" may be an entity that can provide a resource such as goods, services, information, and/or access typically through a service provider computer. Examples of service providers include data providers, transit agencies, merchants, digital wallets, payment processors, etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

An "authorization request message" may be an electronic message that requests authorization for an interaction. In some embodiments, it is sent to a processing network computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction. An "authorization request message" may also be used to request authorization to access a location, access secure data, etc.

An "authorization response message" may be a message that responds to an authorization request. In some cases, it may be an electronic message reply to an authorization request message generated by an issuing financial institution or a processing network computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the processing network computer) to the merchant's access device (e.g., POS equipment) that indicates approval of the transaction. The code may serve as proof of authorization.

An "authorizing entity" may be an entity that authorizes a request. Examples of an authorizing entity may be an issuer, a transit agency, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "application" may be a computer program that is used for a specific purpose. Examples of applications may include transit applications, secure data access applications, banking applications, digital wallet applications, event ticketing applications, loyalty rewards applications, etc. In some embodiments, an application may be associated with an account of the user maintained by a resource or service provider (e.g., a bank account, a mass transit prepaid account, a building access account, etc.).

An "Application Identifier" (AID) can be data that can identify an application. In some embodiments, a AID may be a 16 byte value that is used to uniquely identify each application. Both user devices and access devices may support multiple AIDs. An AID may also be used to identify the system environment supported by an access device (e.g., PSE, PPSE). A user device may store a list of applications identifiers, where each application identifier corresponds to a different application on the user device. The AIDs of one or more applications on the list may be transmitted to the access device during the transaction initialization process, to be used by the access device in determining which applications are mutually supported by both the access device and the user device, and ultimately which application should be selected by the access device from a candidate list to initiate a transaction. In some embodiments, an AID can be formed by the concatenation of a Registered Application Provider Identifier (RID) of 5 bytes, which may be a hexadecimal value, and an optional Proprietary Application Identifier Extension (PIX), which is typically a numeric value. For example, the AID for an access device supporting PPSE may be hexadecimal 325041592E5359532E4444463031 (i.e. RID of hexadecimal 325041592E and a PIX extension of hexadecimal 5359532E4444463031). Also, the AID for a credit card application may, for example, have a RID value of hexadecimal A000000003 and a PIX value of hexadecimal 1010. Thus, concatenated, the AID may be hexadecimal A0000000031010.

A "Payment System Environment" (PSE) can be a mechanism for a user device to store a directory structure that holds records containing a number of applications that are available on the user device to be used to execute transactions. The "Proximity Payment System Environment" (PPSE) is applicable only for contactless communication between a user device and an access device. The PPSE on a user device contains a list of all applications supported by the contactless interface, and is returned from the user device to an access device that issued a SELECT command for the PPSE. Both the PSE and PPSE mechanisms may be used to facilitate a message exchange protocol whereby an access device may select an application (e.g., from the returned list of applications) on a user device to proceed with a transaction. The messages exchanged under both the PSE and PPSE mechanisms may utilize an "Application Protocol Data Unit" (APDU) format. The APDU is a data unit transferred between an access device and a user device. A transaction may include multiple APDU exchanges to read data from a user device and perform the necessary processing steps.

A "Cardholder Verification Method" (CVM) is a function performed by the system (e.g., an access device or user device) to verify the identity of a cardholder or user. A CVM may include verification mechanisms including inputting a passcode or online PIN, cardholder signature, and the like. "Consumer Device Cardholder Verification Method" (CDCVM) is a type of CVM wherein the cardholder is verified via their user device (e.g., smartphone) instead of being verified by a terminal. CDCVM may include, in addition to the mechanisms listed above (performed locally on the user device), biometric verification (e.g., fingerprint or facial recognition) or entering a user device passcode. In some cases, an access device may require a user to perform CDCVM before initializing the transaction.

Details of some embodiments of the present disclosure will now be described in greater detail.

FIG. 1 shows a system 100 comprising a number of components according to an embodiment of the invention. The system 100 comprises a user device 102 used by a user 101, and an access device 103. For clarity, a certain number of components are shown in FIG. 1. It is understood that embodiments of the disclosure may include more than one of each component.

In some embodiments, the user device 102 may include a service provider application such as a mobile wallet application, payment application, or access application that may be provisioned with access data to enable the user device 102 to conduct access transactions. Also, in some embodiments, the user device 102 may be in operative communication with the access device 103 through contactless or contact communication. In some embodiments, the user device 102 can communicate with the access device 103 through a short range contactless mode of communication such as NFC (near field communications), Bluetooth™, Bluetooth™ Low Energy (BLE), Wi-Fi, etc. In some embodiments, the contactless mode of communication may also include the use of audible signals as well as optical signals.

Figure 2:
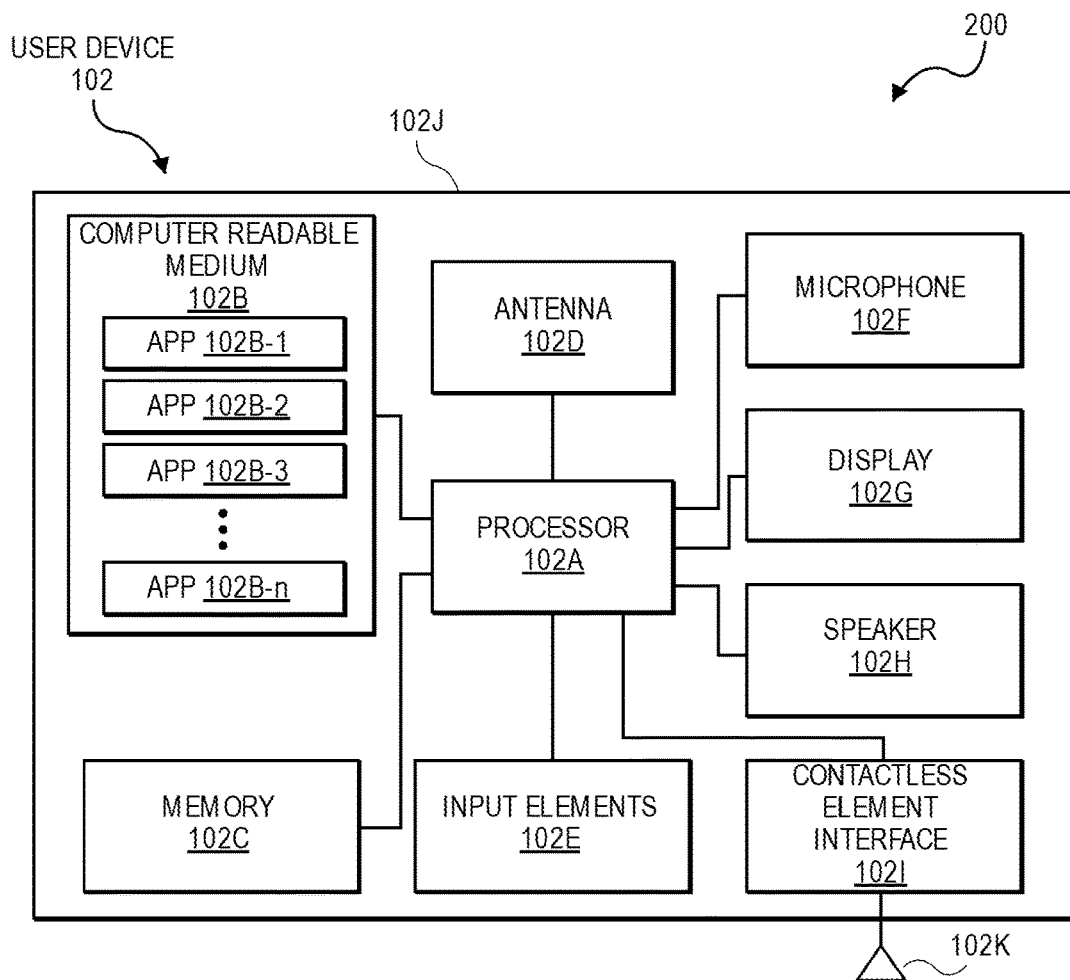
FIG. 2 shows a block diagram of a user device and an access device according to an embodiment.
Figure 2:
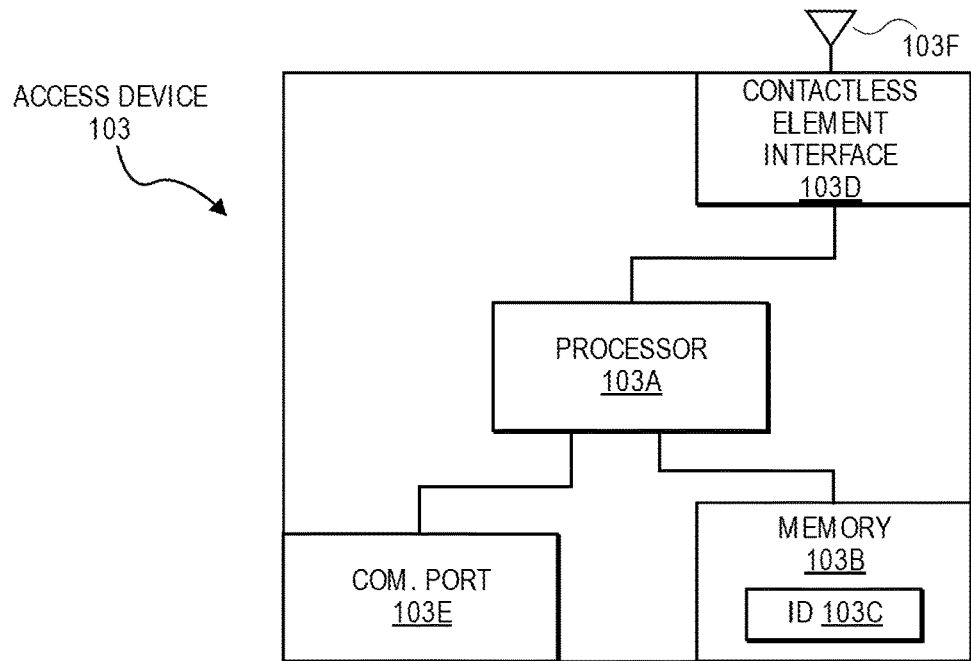

FIG. 2 shows a block diagram 200 of a user device 102 and an access device 103 according to an embodiment.

The user device 102 may also include a processor 102A (e.g., a microprocessor) for processing the functions of the user device 102 and a display 102G to allow a user to view information. The user device 102 may further include input elements 102E (e.g., a touchscreen, keyboard, touchpad, sensors such as biometric sensors, etc.), a speaker 102H, and a microphone 102F, each of which is operatively coupled to the processor 102A. A contactless element interface 102I, an antenna 102D, a memory 102C, and a computer readable medium 102B may also be operatively coupled to the processor 102A.

The computer readable medium 102B and the memory 102C may be present within a body 102J. The body 102J may be in the form a plastic substrate, housing, or other structure. In some cases, the memory 102C may be a secure element, and/or may also store information such as access data, including tokens, PANs, tickets, etc. Information in the memory 102C may be transmitted by the user device 102 to another device using an antenna 102D or contactless element interface 102I. The user device 102 may use antenna 102D for wireless data transfer (e.g., using wireless networking protocols such as IEEE (Institute of Electronics Engineers) 802.11) or mobile phone communication (e.g., 3G, 4G, and/or LTE). Antenna 102K of contactless element interface 102I may be configured for sending and receiving wireless signals at a frequency specified by different wireless protocols such as NFC (Near Field Communication), BLE (Bluetooth Low Energy), RFID (Radio Frequency Identifier), or any other suitable form of short or medium range communications mechanism.

In some embodiments, the contactless element interface 102I is implemented in the form of a semiconductor chip (or other data storage element) with an associated wireless transfer (e.g., data transmission) element, such as an antenna. Data or control instructions that are transmitted via a cellular network may be applied to the contactless element interface 102I. Contactless element interface 102I may be capable of transferring and receiving data using a short range wireless communication capability. Thus, the user device 102 may be capable of communicating and transferring data or control instructions via both a cellular network (or any other suitable wireless network—e.g., the Internet or other data network) or any short range communications mechanism.

The computer readable medium 102B may comprise code, executable by the processor, for implementing methods according to embodiments. For example, the computer readable medium 102B may comprise code, executable by the processor 102A for implementing a method comprising: receiving from an access device, an available applications request message, wherein the available applications request message comprises an access device type identifier; determining whether an association exists between the access device type identifier and one or more application identifiers of a plurality of application identifiers stored on the user device, wherein the plurality of application identifiers respectively correspond to different applications on the user device; and transmitting to the access device, based in part on whether the association exists, an available applications response, the available applications response comprising the one or more application identifiers of the plurality of application identifiers associated with the access device type identifier.

The computer readable medium 102B may contain one or more service provider applications 102B-1-102B-n. The service provider applications 102B-1-102B-n can, in conjunction with the processor 102A, allow the user device 102 to communicate with various service provider computers. Each application can provide functions provided by its respective service provider. Examples of service provider applications can include digital wallet applications, payment applications (e.g., mobile banking application designed and maintained by a bank or payment processing network), merchant applications (e.g., enabling a user's participation in a loyalty rewards program), transit applications (e.g., storing credit from a prepaid card), ticketing applications (e.g., may store pre-purchased tickets for access to an event or location), applications to access secure data, etc.

Access device 103 includes a processor 103A. The processor 103A may be operatively coupled to a memory 103B which may comprise an access device type identifier 103C, a contactless element interface 103D which may include an antenna 103F, and a communication port 103E. Contactless element interface 103D is configured to communicate with (send and/or receive data) the contactless element interface 1021 of the user device 102. In one embodiment, the communication port 103E includes hardware to facilitate wireless network communication (e.g., IEEE 802.11).

In one embodiment, identifier 103C may be an access device type identifier (ADTI) that identifies one or more functions of the access device (e.g., the ability to process a particular proprietary message format, the ability to provide enhanced services beyond a typical payment transaction (such a loyalty rewards program offered by the particular merchant)), and/or a type of behavior that the access device 103 allows and/or expects the user device 102 to support (e.g., not prompting the user for an authentication action, or transmitting a customized list of AIDs to the access device as candidates for application selection by the access device). In some embodiments, identifier 103C may be an application identifier (AID) which may further comprise an ADTI.

Figure 3:
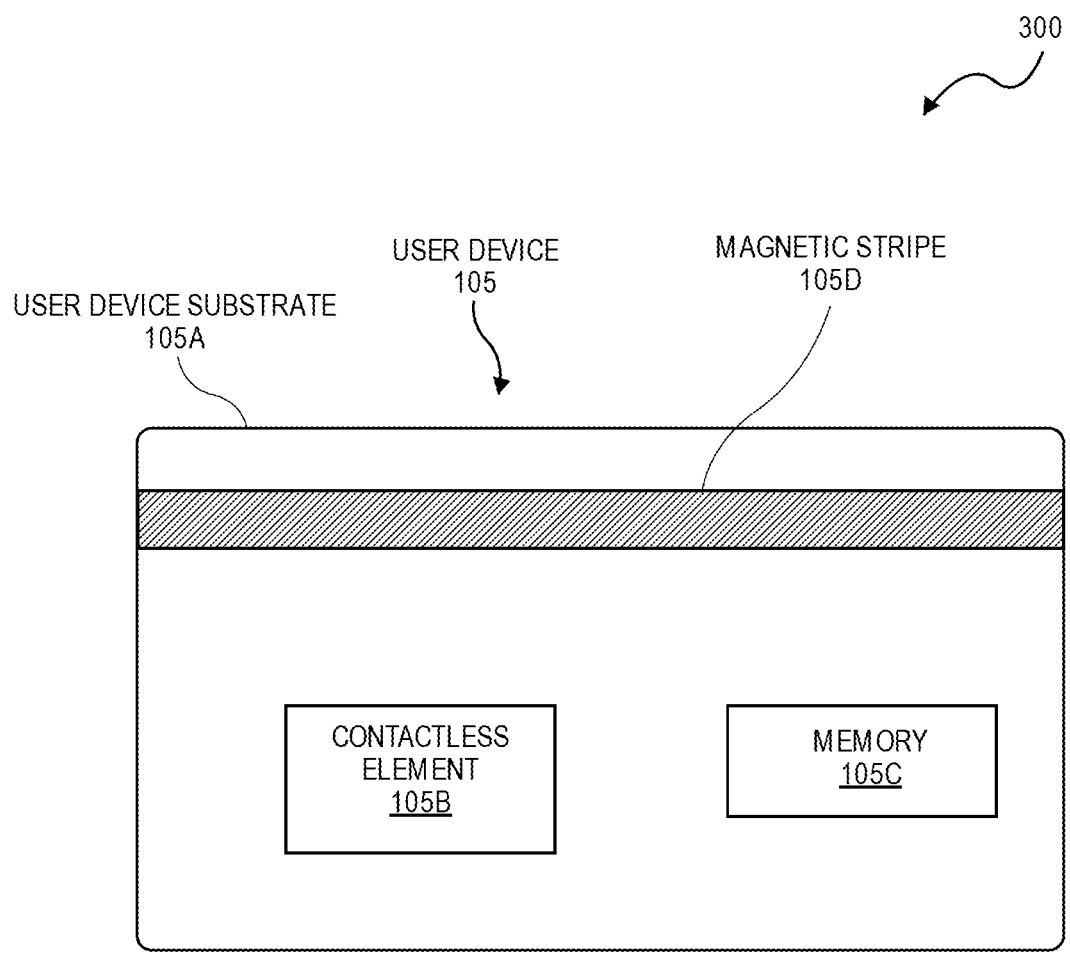
FIG. 3 shows a diagram of a user device according to an embodiment.

FIG. 3 shows a user device 105 in the form of a card. The user device 105 comprises a substrate 105A such as a plastic substrate. A contactless element 105G for interfacing with a data access or data transfer device may be on or embedded within the user device substrate 105A. The contactless element 105G may include a chip, and may include the capability to communicate and transfer data using near field communications (NFC) technology or other short range communications technology. The user device 105 may also include a memory 105C, which may store user information such as an account number, expiration date, and a user name. Such information may also be printed or embossed on the substrate 105A. The substrate 105A may also have a magnetic stripe 105D on it.

Figure 4:
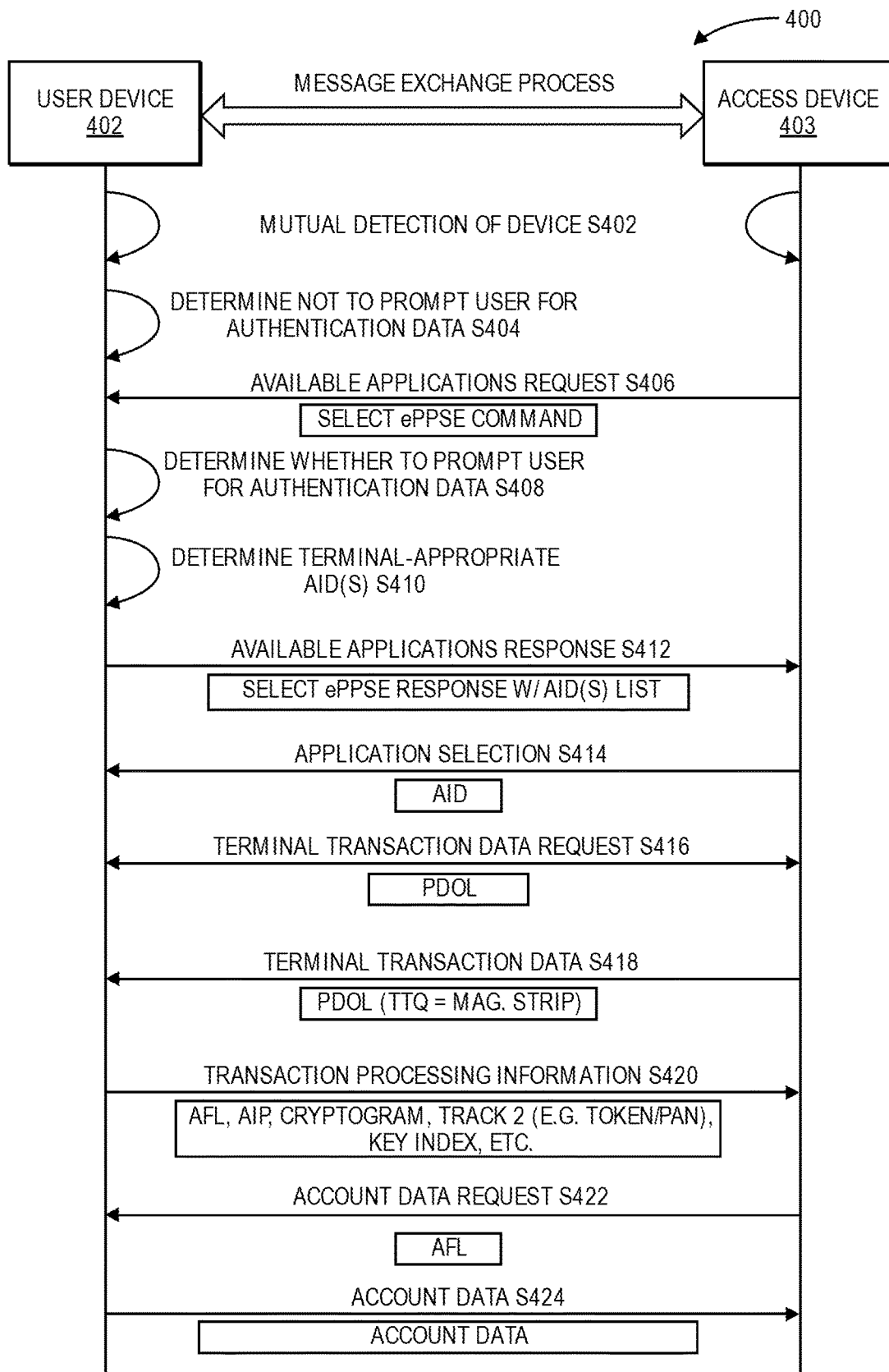
FIG. 4 shows a flow diagram depicting a message exchange process between a user device and an access device, according to an embodiment.

FIG. 4 shows a diagram of a system and a method according to an embodiment of the disclosure. System 400 comprises an access device 403, which may be associated with a resource provider. The system also comprises a user device 402 which may be associated with a user. A user may use the user device 403 to interact with the access device 403 to gain access to a resource.

In some embodiments, the user can use the user device 402 to conducting purchases at the merchant access device 403. In a purchase transaction, the user device 402 can provide payment credentials to the access device 403, which may initiate a payment authorization process.

The user device 402 may store or have access to certain types of user information. For example, the user device 402 may store the user's payment credentials, such as a PAN (primary account number), a payment token, a name, an address, a CVV, an expiration date, and any other suitable information. Such data may be securely stored via hardware (e.g., a secure element) or software.

The user device 402 may also include a digital wallet application, which may include information about one or more user accounts. The accounts may include a variety of possible types, including, for example, payment accounts such as credit or debit card accounts, and non-payment accounts such as a mass transit account linked to a prepaid card, a building access account, a loyalty rewards program account tied to a particular merchant, an account maintaining pre-purchased ticket information which may be used for obtaining access to an event, etc. The user may be able to add accounts, set a default account, prepare the user device 402 for a transaction, and perform other transaction-related functions via the digital wallet application. In some embodiments, different accounts at the digital wallet application may be associated with different applications, and each application may be associated with an Application Identifier (AID), as described earlier.

The user device 402 may also store information that indicates whether an association exists between one or more of the applications on the user device 402 and one or more access device types, where each access device type may correspond with an access device type identifier (ADTI). This association information may be stored within the memory of the user device 102 (e.g., computer readable medium 102B), which may contain association information for multiple applications on the user device 402. In some embodiments, the association information may be stored directly within a particular application on the user device 402.

Figure 7:
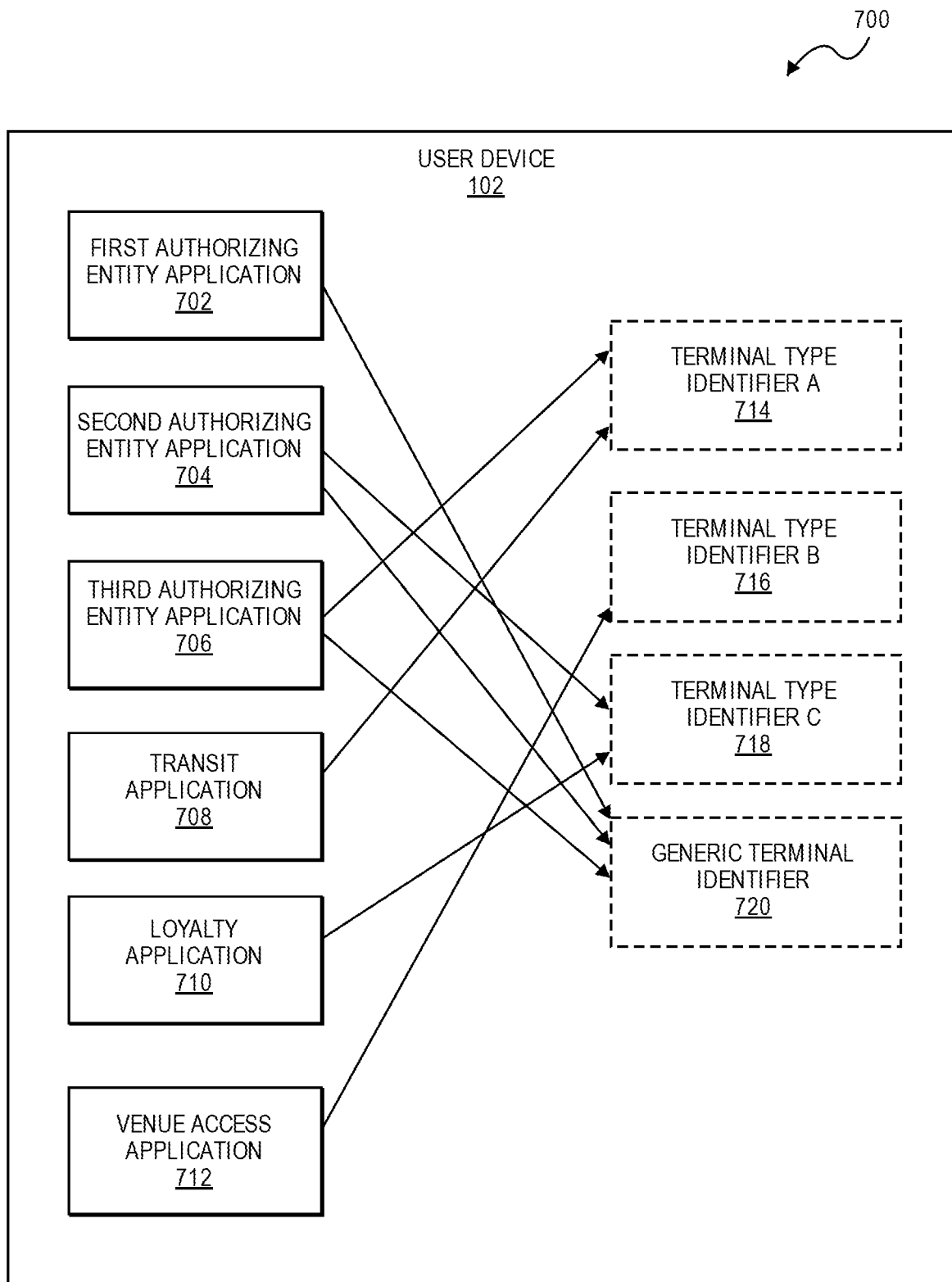
FIG. 7 shows an example diagram of links between different applications on a user device and access device type identifiers, according to an embodiment.

An example diagram of links (i.e. associations) between applications on the user device 402 and access device types is shown in FIG. 7. For example, in the case where the user device 402 is a mobile phone, applications 702, 704, 706, 708, 710, 712 may be applications stored on the computer readable medium 102B of the user device 402 and linked with a digital wallet application. Each application 702, 704, 706, 708, 710, 712 may have an associated AID. The terminal type identifiers 714, 716, 718 may each correspond to different access device types. Each identifier 714, 716, 718 may be a unique ADTI value. The ADTI value may be within a data field of an AID associated with the access device. In contrast, Generic Terminal Identifier 720 may correspond to an access device that is not associated with any ADTI value, and is therefore not specifically identifiable by a user device as being of a specific terminal type. As shown in FIG. 7, multiple applications can be associated with a single ADTI.

In FIG. 7, the first, second, and third authorizing entity applications 702, 704, 706, may respectively correspond to different credit card payment applications. All three of the credit card payment applications may be associated by default with Generic Terminal Identifier 720. That is, an access device with Generic Terminal Identifier 720 may not be associated with any particular ADTI or terminal type, and may simply be configured to process standard payment transactions. For example, a user device that receives Generic Terminal Identifier 720 from an access device may return a list of AIDs for all three payment applications 702, 704, 706 to the access device.

In contrast, an access device with terminal type identifier 718 may be a 'LOYALTY' ADTI. Both the credit card payment application 704 and the loyalty application 710 may be associated with the 'LOYALTY' ADTI. Accordingly, a user device may, upon receiving a message from an access device with the terminal type identifier 718 (i.e. 'LOYALTY' ADTI), selectively transmit only the associated AIDs of applications 704, 710 to the access device for further processing.

An access device with terminal type identifier 716 may be an 'EVENT' ADTI. The venue access application 712 may be, for example, an movie theater application that maintains pre-purchased movie tickets for future use. A user device may, upon receiving a message from an access device with the terminal type identifier 716 (i.e. 'EVENT' ADTI), selectively transmit only the associated AID of the venue access application 712 to the access device for further processing.

An access device with terminal type identifier 714 may be a 'TRANSIT' ADTI. Both the credit card payment application 706 and the transit application 708 may be associated with the 'TRANSIT' ADTI. The credit card payment application 706 may correspond to a corporate credit card account, which may be provided to a user by his or her employer for purchases and use on mass transit systems. A user device 402 may, upon receiving a message from an access device with terminal type identifier 714 (i.e. 'TRANSIT' ADTI), selectively transmit only the associated AIDs of the applications 706, 708 to the access device for further processing.

Returning to FIG. 4, a method according to the embodiments may also be described. Although the following description includes descriptions of payment processing, it is understood that the method can be used in other contexts (e.g., access to a secure location or secure data).

In one embodiment, the user may select one or more goods and/or services for purchase at a merchant, and then initiate a payment transaction. The user may choose to pay via user device 402. In some embodiments, the user may activate a digital wallet application, select a payment account, and initiate payment functionality on the digital wallet application. At step S402, the user may hold the user device 402 near to the access device 403, such that both devices mutually detect each other.

In some embodiments, a contactless transaction can then be carried out by exchanging messages (e.g., Application Protocol Data Unit (APDU) messages) between the user device 402 and the access device 403. The messages can be in the form of APDU commands sent from the access device 403 to the user device 402, and APDU responses sent from the user device 402 to the access device 403. As described in this method, NFC will be used for the communications. However, embodiments allow other communication means (e.g., BLE, RFID) to be used as well.

At step S404, the user device 402 may determine that it should delay prompting the user for authentication data until it receives a message from the access device 403 indicating the type of transaction that the access device 403 supports. At a later time (e.g., step S408) the user device 402 can determine whether or not to prompt the user for authentication data. By delaying the prompting for authentication data until determining the type of access device 403 that the user device 402 is interacting with, the user device 402 may conduct transactions more efficiently (i.e., only prompting for authentication data when it is necessary to complete a particular type of transaction).

At step S406, the access device 403 may send an available applications request message to the user device 402 to request information regarding which applications (e.g., a list of AIDs) may be available on the digital wallet application of user device 402. The available applications request message contains an ADTI for the access device 403. In some embodiments, the available applications request message may be an enhanced available applications request message in the form of a SELECT "enhanced PPSE" (ePPSE) command.

In some embodiments, the ADTI may be transmitted by the access device 403 as a value in a data field within a SELECT command message. Table 1 below shows example codes and values that may be included in a SELECT command message. Table 2 below further provides an example of ADTI values for a data field within a SELECT command message, which, if included in a SELECT command message, may render that message a SELECT ePPSE command (an enhanced PPSE command). The ADTI values may be inserted into an existing data field, or a data field may be added for the ADTI value.

TABLE 1

SELECT Command Message

| Name | Name | Description | Example Values |
|------|------|-------------|----------------|
| CLA | Class of Instruction | Class of Instruction | '00'-'03', '40'-'4F' |
| INS | Instruction code | Instruction code | 'A4' |
| P1 | Instruction parameter 1 | Instruction parameter 1 | '04' |
| P2 | Instruction parameter 2 | Instruction parameter 2 | '00' |
| Lc | Length | Number of bytes present in data field of command | Length of the command data field |
| Data | Data field | String of bytes | Variable |
| Le | Length | Max number of bytes expected in the data field of response to the command | '00' |

TABLE 2

Example ADTI Values (included within a data field of a SELECT ePPSE Command Message)

| ADTI Value | AID | Terminal Environment |
|------------|-----|----------------------|
| 'TRANSIT' | RID \|\| 'TRANSIT' | Mass transit |
| 'EVENT' | RID \|\| 'EVENT' | Event |
| 'LOYALTY' | RID \|\| 'LOYALTY' | Loyalty |

As shown in Table 2, an enhanced available applications request message in the form of a SELECT ePPSE command may include a data field which contains an AID, the AID formed by the concatenation of an RID and PIX value, as described above. To indicate the payment environment supported by the access device, the AID may include a payment environment identifier within the RID value (e.g., 325041592E5359532E4444463031 (indicating PPSE support) or 315041592E5359532E4444463031 (indicating PSE support)). The ADTI of the SELECT ePPSE command may be a value contained within the PIX of an AID. Examples of ADTI values include, but are not limited to, the string values shown in Table 2. Thus, for example, the AID of a mass transit enhanced access device supporting PPSE may be a concatenation of the RID (32 50 41 59 2E) and the PIX (54 52 41 4E 53 49 54), which may be further represented as 32 50 41 59 2E 54 52 41 4E 53 49 54 and transmitted to a user device.

At step S408, user device 402 may determine, based at least in part on the ADTI received from access device 403, whether user interaction on the user device is necessary. For example, the user device 402 may determine whether or not to prompt the user for authentication data. For example, in an embodiment wherein the ADTI value is 'LOYALTY', the user device 402 may determine from the ADTI that the access device 403 supports payment transactions with additional functionality to process loyalty rewards information associated with the user's payment account. Accordingly, the user device 402 may decide to prompt the user for authentication data before proceeding with the transaction and replying back to the access device 403 with an enhanced available applications response message.

At step S410, the user device 402 may determine whether an association exists between the ADTI received from the access device 403 and one or more AIDs of a plurality of AIDs stored on the user device 402. The plurality of AIDs respectively correspond to different applications on the user device 402. The user device 402 may perform this determination by, for example, accessing an associations table (e.g., similar to the associations depicted in FIG. 7) maintained by a digital wallet application on the user device 402.

At step S412, the user device 402 may transmit to the access device 403, based in part on whether the association determined in step S410 exists, an enhanced available applications response, comprising the one or more AIDs of the plurality of AIDs associated with the ADTI. In some embodiments, the enhanced available applications response message may be in the form of an enhanced PPSE (ePPSE) response.

As mentioned above, a SELECT ePPSE response message may utilize the same data fields as a SELECT PPSE response message, and may include file control information (FCI). This may include, but is not limited to, an application definition file (ADF) name, application label, application priority indicator, language preference, kernel identifier indicating the application's kernel preference, and/or additional information relating to the particular ADF. Also, each ADF name may correspond with an AID of an application on the user device 402. Accordingly, the user device 402 may return an application list of one or more directory entries, wherein each directory entry may correspond with an associated AID on the user device 402 and include one or more of the data fields listed above. For example, if the access device 403 has an ADTI value of 'LOYALTY' 718, the user device may decide to send an application list containing the associated AIDs (e.g., loyalty application 710 and the second authorizing entity application 704). A portion of the data fields listed above may be represented in list form as:

Directory Entry('61'){
ADF Name='A0 00 00 00 06 01'
Application Label="My Best Buy Rewards"
Application Priority Indicator='0002'
. . . .
}
Directory Entry('61')
ADF Name='A0 00 00 00 03 90 10'
Application Label="My Best Buy Visa"
Application Priority Indicator='0001'
. . . .
}

In the example list above, each directory entry includes the ADF name (represented as an AID (i.e. RID||PIX) in hexadecimal form), a mnemonic as the application label, and an application priority indicator with a numerical value. In some embodiments, a value of 1 may correspond with the highest priority application. Accordingly, in this example, the 'My Best Buy Visa' application may have a higher priority than the 'My Best Buy Rewards' application when transacting with an access device 403 with a 'LOYALTY' ADTI value. The enhanced available applications response may also include other data such as FCI issuer discretionary data or any other relevant information.

At step S414, the access device 403 may determine a mutually supported application based on the received application list of associated AIDs received at step S412. It should be noted that the access device 403 may utilize any suitable mechanism, including, but not limited to, an application priority indicator received from the user device 402, for selecting an application from the application list (e.g., also considering the access device's 403 preferred application(s)). The access device 403 may then send an "application selection" command including the selected AID to the user device 402.

In the embodiment depicted in the subsequent steps of FIG. 4 (i.e., S416-S424), the particular application selected by the access device 403 may be a used for conducting payment transactions utilizing APDU formatted messages. For example, in the case where access device 403 as a 'LOYALTY' ADTI value, the subsequent APDU messages of S416-S424 may be used to not only conduct a standard payment transaction, but also communicate additional information regarding the user's loyalty rewards account that may be updated per this particular transaction. However, as discussed in FIG. 5 below, in other embodiments, the access device 403 may select a proprietary application (i.e., step S514), in which case subsequent messages that are exchanged may be exchanged according to a proprietary protocol.

At step S416, the user device 402, upon receiving the application selection message at step S414, may send a terminal transaction data request to request transaction data from the access device 403 which may be needed complete the provisioning process for the selected application associated with the selected AID. In some embodiments, the terminal transaction data request may be in the form of a "Select AID Response" and may include application identifier (AID) file control information (FCI) with the selected AID as the dedicated file name. The terminal transaction data request may include a list of transaction data identifiers to request the appropriate data from the access device 403. The list of transaction data identifiers can be in the form of a processing options data object list (PDOL).

The transaction data requested by the user device 402 for the transaction may include an entity identifier associated with the access device 403, terminal processing options (TPO), an amount, and other information. In addition, the transaction data may include one or more dynamic data elements (e.g., a random number). In other embodiments, the transaction information may be provided as part of the application selection message at step S414.

At step S418, after receiving the terminal transaction data request from user device 402, the access device 403 may send to the user device 402 the terminal transaction data requested by the user device 402. In some embodiments, the terminal transaction data may be sent in the form of a get processing options (GPO) command, and may include the requested terminal transaction data in a processing options data object list (PDOL). The terminal transaction data (e.g., Transaction Processing Options (TPO)) may include a TPO indicator that indicates which transaction data types the access device 403 supports. In some embodiments, to facilitate an access data provisioning process by utilizing APDU commands, the access device 403 may send the user device 402 a zero dollar value as part of the terminal transaction data. It should be understood that in some embodiments, the value may be any amount.

At step S420, once the user device 402 receives the terminal transaction data, the user device 402 may obtain relevant credentials (e.g., card credentials), and may send a set of transaction processing information to the access device 403. In some embodiments, the transaction processing information can be sent in the form of a "get processing options" (GPO) response. In some embodiments, the transaction processing information may include one or more application file locators (AFLs) that can be used as file addresses by access device 403 to read account data stored on the user device 403, and an application interchange profile (AIP) that can be used to indicate the capabilities of the payment application.

The transaction processing information may include any credentials for the transaction including a cryptogram generated using transaction information, Track-2 equivalent data (e.g., PAN, expiration date), and/or additional data. For example, the cryptogram may be generated using transaction information, which may include a dynamic data element (e.g., the random number), the user device 402 identifier (e.g., a PAN), and optionally other information such as a session identifier, a value such as a zero dollar amount, and a transaction counter. The transaction processing information may also include issuer application data (IAD), a form factor indicator (FFI), card transaction qualifiers (CTQ), cryptogram information data (CID), and/or an application PAN sequence number (PAN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g., a master key associated with the issuer), and/or card verification results (CVR).

At step S422, after the access device 403 receives the transaction processing information, the access device 403 may send an account data request to the user device 402 to read additional account data that may be stored on the user device 402. In some embodiments, the account data request may be in the form of a "read record" command, and may include an application file locator (AFL) indicating the location of the account data that the access device 403 is attempting to read. The AFL included in the account data request may correspond to an AFL in the transaction processing information that was provided to the access device 403 from user device 402.

At step S424, in response to receiving the account data request from the access device 403, the user device 402 may send account data stored at the location indicated by the AFL to access device 402. In some embodiments, the account data may be sent in the form of a "read record" response. The account data may include, for example, application usage control that indicates the issuer's restrictions on usage and services allowed for the application, the cardholder's name, customer exclusive data, issuer country code, and/or other account related data that is accessible at the AFL location and is stored in the user device 402. In some embodiments, the account data may include user data regarding their participation in a loyalty rewards program, which the access device 403 may be configured to further process (e.g., adding points to the customer's loyalty rewards account). The account data, transaction processing information, and other data received by the access device 403 in previous steps may be subsequently used by the access device 403 to complete the payment transaction.

Figure 5:
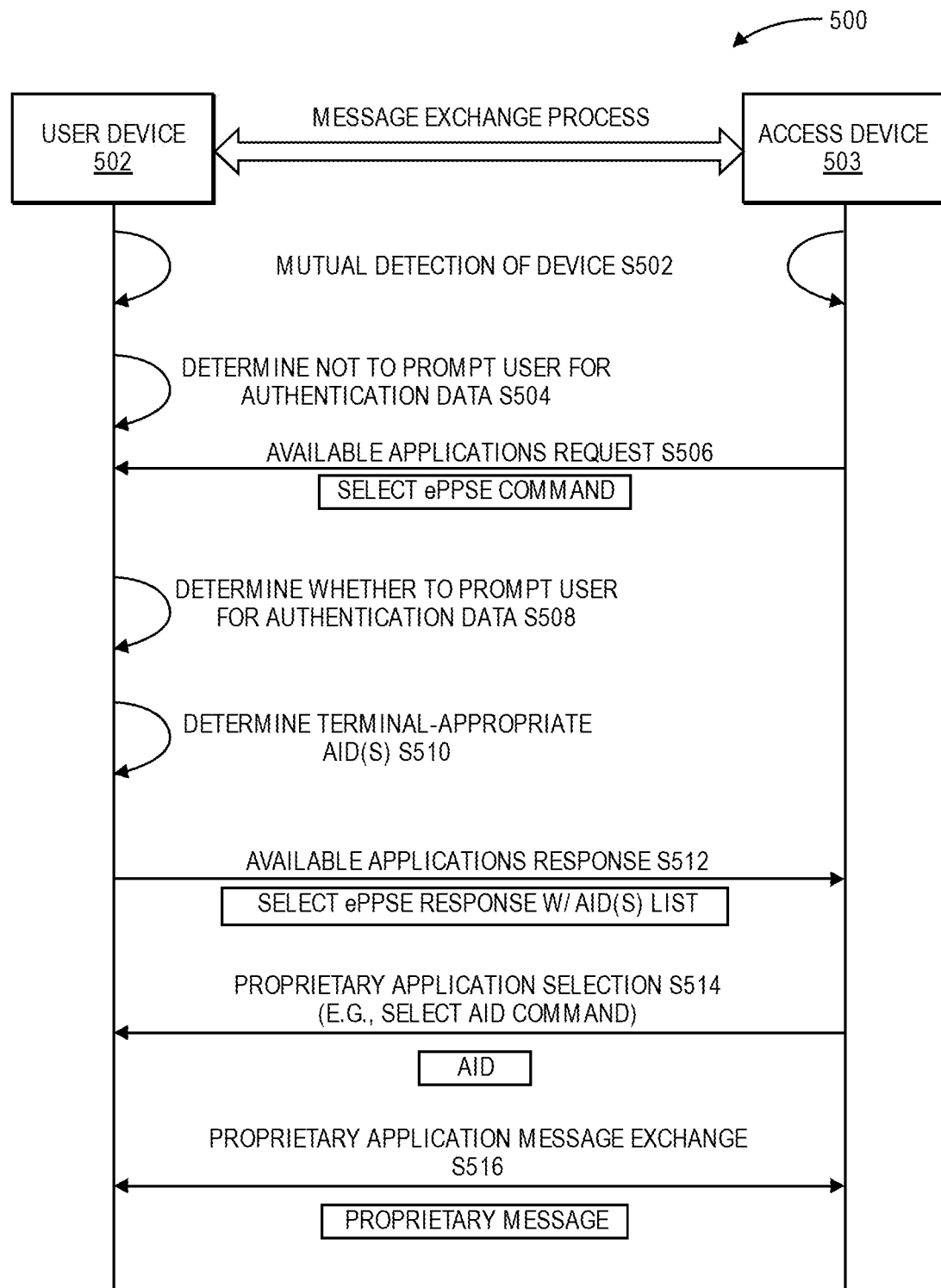
FIG. 5 shows a flow diagram depicting a message exchange process between a user device and an access device, according to an embodiment.

FIG. 5 shows a system diagram and method according to an embodiment of the disclosure. The system 500 may be similar to that of system 400, comprising an access device 503 and a user device 502. However, the method depicted in FIG. 5 illustrates a transaction between a proprietary application (e.g., used for a non-payment transaction) on the user device 502 and an access device 503 that is configured to receive and process proprietary messages (e.g., non-APDU format) from the proprietary application. The access device 503 may be configured to subsequently perform proprietary behavior, based on the proprietary message exchange. An example of such a proprietary transaction system is described below and also depicted in FIG. 8.

The user device 502 may be a mobile phone. An application (e.g., digital wallet application) may also be stored on user device 502. The application may be linked to applications stored on the user device 502, each application having a corresponding AID. One or more of the applications on the user device 502 may each be associated with a particular type of access device.

The access device 503 may include a device reader and a turnstile in a mass transit environment, which requires the user to tap or hold the user device 502 to the access device 503 to access mass transit services.

At step S504, the user device 502 may decide to delay prompting the user for authentication data until it receives a message from the access device 503 indicating the type of transaction that the access device 503 supports.

At step S506, similar to step S406 of FIG. 4, the access device 503 may initiate a transaction by sending an enhanced available applications request message (e.g., SELECT ePPSE command) to the user device 402 to request information on which applications (e.g., a list of AIDs) may be available on the application of user device 402. The SELECT ePPSE command may have an ADTI value of 'TRANSIT.'

At step S508, user device 502 may determine, based at least in part on the ADTI (e.g., 'TRANSIT') received from access device 503, whether user interaction on the user device is necessary (e.g., whether or not to prompt the user for authentication data). The user device 502 may determine from the ADTI that the access device 503 supports mass transit transactions. Accordingly, the user device 402 may determine that the access device 503 will not require authentication to proceed. The user device 402 will therefore not prompt the user for authentication data.

At step S510, the user device 502 may determine whether an association exists between the ADTI received from the access device 503 and one or more AIDs stored on the user device 402. In one embodiment using FIG. 7 for illustration, the user device 502 may return AIDs for both the third authorizing entity application 706 and the transit application 708 to the access device 503, as they are both associated with a 'TRANSIT' ADTI value. In some embodiments, an application priority indicator may also be included within an enhanced available applications response, which may be used by access device 503 to select the appropriate application that is supported and/or preferred by both the access device 503 and the user device 502.

At step S512, similar to step S412 of FIG. 4, the user device 502 may transmit to the access device 503, based in part on whether the association determined in step S510 exists, an enhanced available applications response, comprising the one or more AIDs associated with the ADTI.

At step S514, the access device 503 may determine a mutually supported application based on the received application list of associated AIDs received at step S512. In the embodiment of FIG. 5, the access device 503 may select a proprietary application (e.g., that is capable of processing messages using a non-APDU format). It should be understood that, while the messages exchanged to process the transaction itself may have a proprietary format, the message exchange process (S502-S514) used to facilitate determining the appropriate application to select on the user device may utilize APDU formatted messages. It should also be noted that the access device 503 may utilize any suitable mechanism, including, but not limited to, an application priority indicator received from the user device 502, for selecting an application from the application list (e.g., also considering the access device's 503 preferred application(s)). For example, the access device 503 may determine that the application priority indicator for the transit application 708 is ranked higher than the third authorizing entity application 706. Accordingly, the access device 503 may select the transit application. The access device 503 may then send an "application selection" command including the selected AID to the user device 502.

At step S516, the user device 502 and access device 503 may proceed with a proprietary message exchange to conduct the transaction. This exchange may include, for example, messages instructing the proprietary application to deduct a certain amount from a prepaid transit card, to prompt the user that the transit card needs to be re-filled, etc.

Figure 6:
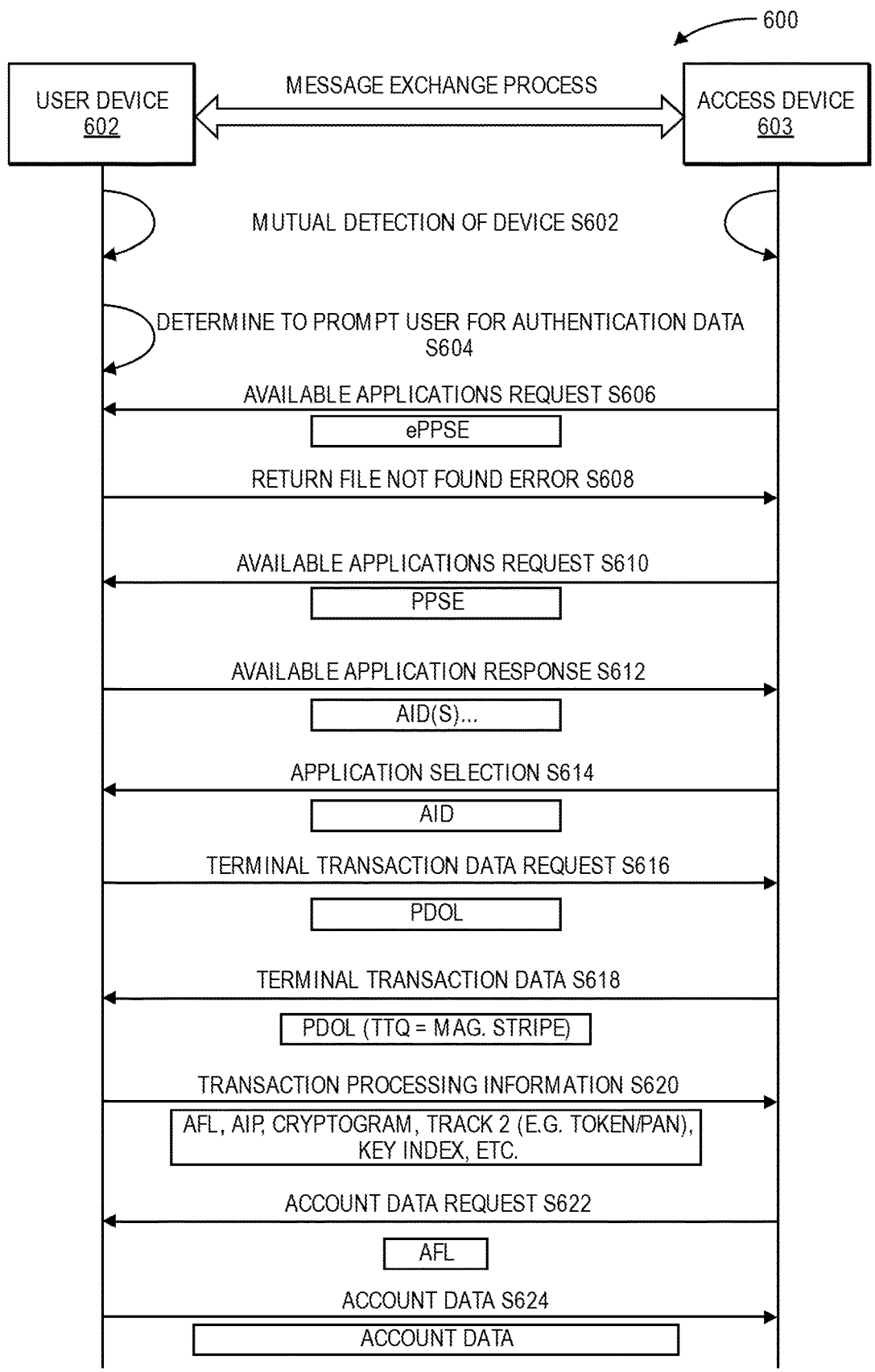
FIG. 6 shows a flow diagram depicting a message exchange process between a user device and an access device, according to an embodiment.

FIG. 6 shows a diagram system and method, according to an embodiment of the disclosure. The system 600 may include a user device 602 and an access device 603. In this example, the access device 603 does not contain a terminal type identifier or ADTI. Also, the user device 602 may have an application stored on user device 502. The application may be linked to applications stored on the user device 502, each application having a corresponding AID. However, in this example, the user device 602 is not configured with a feature to analyze or process an ADTI value received within an enhanced available applications request message from the access device 603. For example, a digital wallet application on the user device 602 may be an early version that cannot process ADTI values.

At step S602, the user may hold the user device 602 close to the access device 603, such that both devices mutually detect each other.

At step S604, the user device 602 may prompt the user for authentication data. In this embodiment, the user device 602 neither delays prompting until receiving an available applications request message from the access device 603 nor makes a later determination of whether or not to prompt for authentication data based on an ADTI value received from the access device 603. Instead, it may invariably prompt the user for authentication data (a CDCVM).

At step S606, the access device 603 may generate a first available applications request message (i.e., an enhanced available applications request message), which may be a SELECT ePPSE command, and transmit the message to user device 602.

At step S608, the user device 602 may determine that it is not able to process the first available applications request message (i.e., because it is unable to interpret the ADTI value within the enhanced available applications request message). Accordingly, the user device 602 may return an error message (e.g., "File not found", or other suitable format) to the access device 603.

At step S610, upon receiving the "File not found" error message from step S608, the access device 603 may send a second available applications request message to the user device 602 (i.e. a non-enhanced available applications request message), which may be in the form of a SELECT PPSE/PSE command. In some embodiments, the additional time elapsed between the first available applications request message and the second available applications request message (i.e., the additional time added to the transaction due to the error message) may be at most 20 milliseconds (ms).

At step S612, the user device 602 may transmit to the access device 603 an available applications response (i.e. a non-enhanced available applications response, which is determined independently from the value of the ADTI previously received from access device 603). The available applications response (e.g., SELECT PPSE response) may include a list of AIDs that are stored on the user device. It may also include some or all of the data fields described in step S412 of FIG. 4.

At step S614, the access device 603 may determine a mutually supported application based on the received application list of associated AIDs received at step S612. It should be noted that the access device 603 may utilize any suitable mechanism, including, but not limited to, an application priority indicator received from the user device 602, for selecting an application from the application list (e.g., also considering the access device's 603 preferred application(s)). The access device 603 may then send an "application selection" command including the selected AID to the user device 602.

The remaining steps of FIG. 6 (i.e. S616-S624) may be performed between the access device 603 and a user device 602 for conducting a standard payment transaction (i.e., without the use of an ADTI to provide additional functionality (e.g., adding points to a customer's loyalty rewards account based on the payment transaction)). As such, the remaining steps S616-S624 may be substantially similar, respectively, to steps S416-S424 of FIG. 4 for processing a standard payment transaction. The descriptions of the steps in FIG. 4 are incorporated herein.

Once the access device has received the appropriate data from the user device as described above, different types of transactions or interactions can be conducted. Two examples of different types of transactions are discussed in FIGS. 8 and 9.

Figure 8:
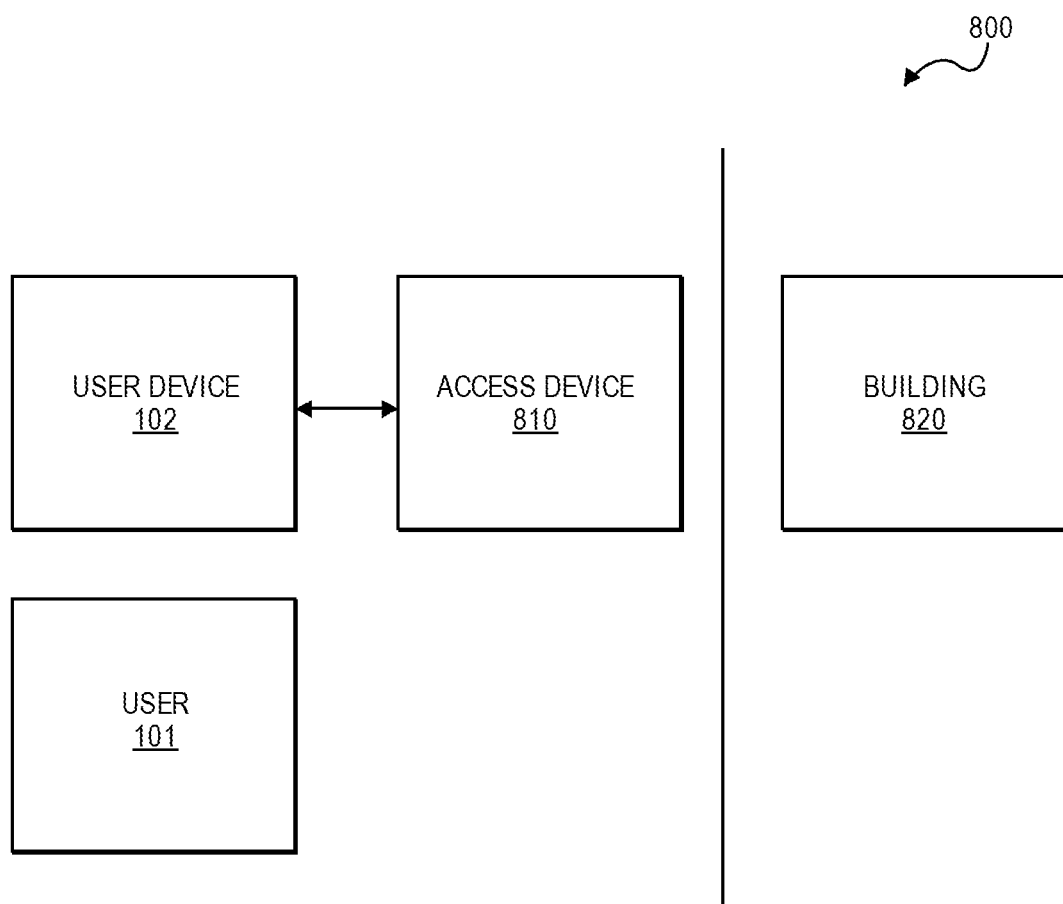
FIG. 8 shows a block diagram illustrating a building access system.

FIG. 8 shows a block diagram of a building access system and a user device 102 operated by a user 101. The user device 102 may interact with the access device 810 and obtain the access data needed to enter the building, event, etc. The access device 810 may locally verify the received access data or it may communicate with a remotely located authentication server computer (not shown). The remotely located authentication server computer may verify that the access data is authentic and may transmit a signal indicating this back to the access device 810. The access device 810 may then proceed to let the user 101 enter the building 820.

Figure 9:
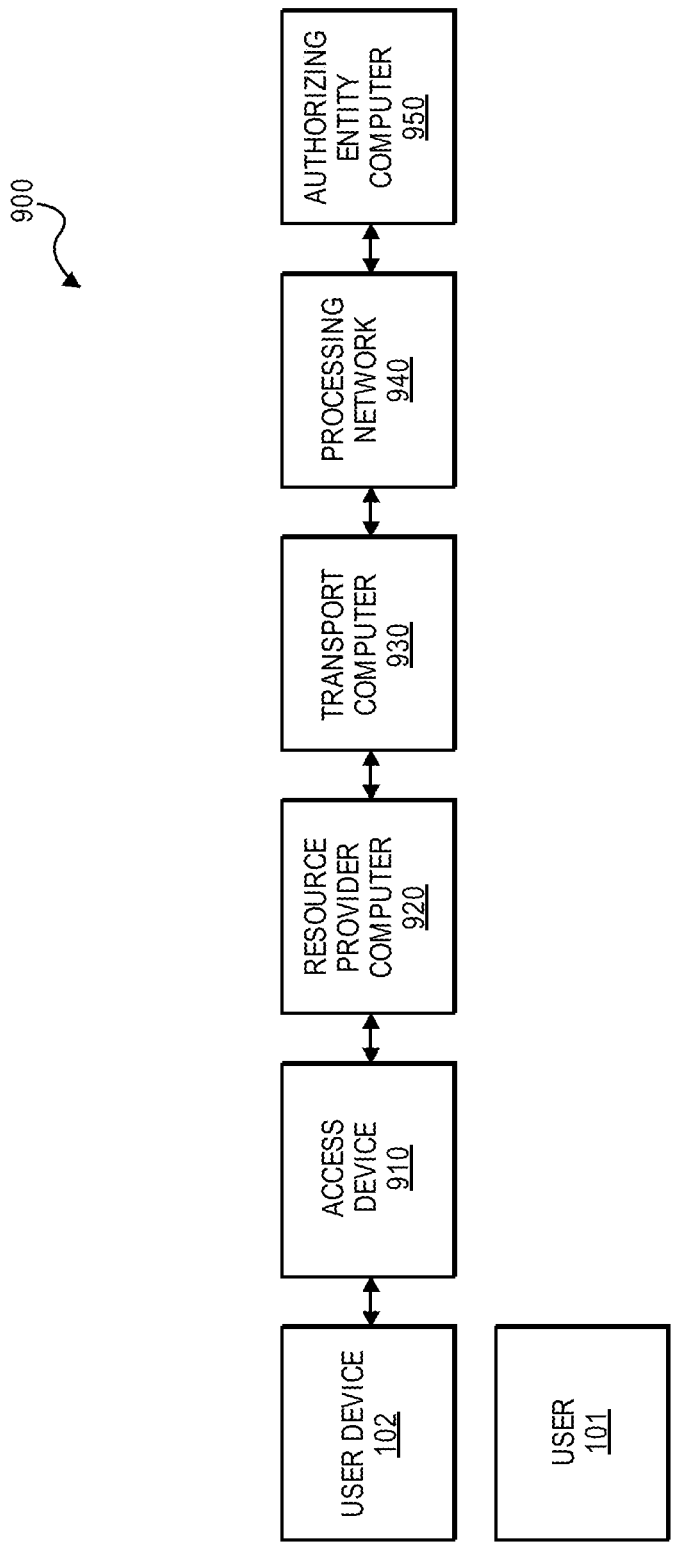
FIG. 9 shows a block diagram illustrating a payment processing system.

FIG. 9 shows a block diagram of a transaction processing system. A user 101 operates a user device 102 that has been provisioned with access data (e.g., a token). The user 101 may use the user device 102 to pay for a good or service at a resource provider such as a merchant. The merchant may operate a resource provider computer 920 and/or an access device 910. The merchant may communicate with an authorizing entity computer 950 operated by an issuer, via a transport computer 930 operated by an acquirer and a processing network 940 such a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a user device 102 to interact with an access device 910 can be described as follows. A user 101 presents his or her user device 102 to an access device 910 to pay for an item or service. The user device 102 and the access device 910 interact such that access data from the user device 102 (e.g., PAN, a payment token, verification value(s), expiration date, etc.) is received by the access device 910 (e.g., via contact or contactless interface). The resource provider computer 920 may then receive this information from the access device 910 via an external communication interface. The resource provider computer 920 may then generate an authorization request message that includes the information received from the access device 910 (i.e. information corresponding to the user device 103) along with additional transaction information (e.g., a transaction amount, merchant specific information, etc.) and electronically transmits this information to a transport computer 930. The transport computer 930 may then receive, process, and forward the authorization request message to a processing network 940 for authorization.

In general, prior to the occurrence of a credit or debit-card transaction, the processing network 940 has an established protocol with each issuer on how the issuer's transactions are to be authorized. In some cases, such as when the transaction amount is below a threshold value, the processing network 940 may be configured to authorize the transaction based on information that it has about the user's account without generating and transmitting an authorization request message to the authorizing entity computer 950. In other cases, such as when the transaction amount is above a threshold value, the processing network 940 may receive the authorization request message, determine the issuer associated with the user device 102, and forward the authorization request message for the transaction to the authorizing entity computer 950 for verification and authorization. Once the transaction is authorized, the authorizing entity computer 950 may generate an authorization response message (that may include an authorization code indicating the transaction is approved or declined) and transmit this electronic message via its external communication interface to processing network 940. The processing network 940 may then forward the authorization response message to the transport computer 930, which in turn may then transmit the electronic message comprising the authorization indication to the resource provider computer 920, and then to the access device 910.

If the access data is in the form of a token, then the processing network 940 may exchange the token for a real credential (e.g., a PAN). Any authorization request message may then be modified to include the real credential and it may be forward to the authorizing entity computer 950 for verification. The authorizing entity computer 950 can generate an authorization response message with an approval or decline. The authorization response message can be transmitted to the processing network 940, and the processing network 940 may replace the credential with the token. The processing network 940 may then transmit the authorization response message back to the access device 910.

At the end of the day or at some other suitable time interval, a clearing and settlement process between the resource computer 920, the transport computer 930, the processing network 940, and the authorizing entity computer 950 may be performed on the transaction.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a user device from an access device prior to receiving an application selection message, an available applications request message, wherein the available applications request message comprises a data field comprising a first application identifier (AID), the first application identifier comprising (1) a first registered application provider identifier (RID) comprising a proximity payment systems environment (PPSE) identifier, and (2) a first proprietary application identifier extension (PIX) comprising an access device type identifier, wherein the access device type identifier indicates that authentication data of a user associated with the user device is not needed prior to conducting a transaction via the access device;

determining, by the user device, not to prompt the user for the authentication data in response to receipt of the access device type identifier;

determining, by the user device, whether a linkage exists between the access device type identifier and one or more application identifiers of a plurality of application identifiers stored on the user device wherein the plurality of application identifiers respectively correspond to different applications on the user device;

selecting, by the user device, based in part on whether the linkage exists, at least one application identifier of the plurality of application identifiers;

transmitting, by the user device to the access device, an available applications response, the available applications response comprising the at least one application identifier, wherein the at least one application identifier is used for generating the application selection message that indicates a selection a particular application of the different applications on the user device; and transmitting, by the user device to the access device, one or more messages operable for completing the transaction involving the particular application on the user device.

2. The method of claim 1, wherein the available applications request message and the available applications response are respectively transmitted using a near-field communication (NFC) protocol.

3. The method of claim 1, wherein the available applications request message and the available applications response are Application Protocol Data Unit (APDU) messages.

4. The method of claim 3 wherein a format of the available applications request message is a command APDU format and the access device type identifier is received as a data field of the command APDU format.

5. The method of claim 1, wherein the access device type identifier identifies (1) a function of the access device or (2) a type of behavior that the access device allows or expects the user device to support.

6. The method of claim 5, wherein the authentication data comprises a biometric or a passcode.

7. The method of claim 1, wherein the determination of whether the linkage exists between the access device type identifier and the one or more application identifiers of the plurality of application identifiers stored on the user device is performed based in part on a feature of the user device.

8. The method of claim 7, wherein the feature of the user device is a mobile phone and wherein the access device is a mass transit terminal.

9. A user device comprising:
a processor; and
a computer readable medium, coupled to the processor, the computer readable medium comprising code, executable by the processor, for implementing a method comprising:
receiving from an access device prior to receiving an application selection message, an available applications request message, wherein the available applications request message comprises a data field comprising a first application identifier (AID), the first application identifier comprising (1) a first registered application provider identifier (RID) comprising a proximity payment systems environment (PPSE) identifier, and (2) a first proprietary application identifier extension (PIX) comprising an access device type identifier, wherein the access device type identifier indicates that authentication data of a user associated with the user device is not needed prior to conducting a transaction via the access device;

determining, by the user device, not to prompt the user for the authentication data in response to receipt of the access device type identifier;

determining whether a linkage exists between the access device type identifier and one or more application identifiers of a plurality of application identifiers stored on the user device, wherein the plurality of application identifiers respectively correspond to different applications on the user device;

selecting at least one application identifier of the plurality of application identifiers based in part on whether the linkage exists;

transmitting to the access device an available applications response, the available applications response comprising the at least one application identifier, wherein the at least one application identifier is used for generating the application selection message that indicates a selection of a particular application of the different applications on the user device; and transmitting to the access device one or more messages operable for completing the transaction involving the particular application on the user device.

10. The user device of claim 9, wherein the available applications request message and the available applications response are respectively transmitted using a near-field communication (NFC) protocol.

11. The user device of claim 9, wherein the available applications request message and the available applications response are Application Protocol Data Unit (APDU) messages.

12. The user device of claim 11, wherein a format of the available applications request message is a command APDU format and the access device type identifier is received in a data field of the command APDU format.

13. The user device of claim 9, wherein the method further comprises:
detecting that the access device is proximate to the user device.

14. The user device of claim 13, wherein the user device is a mobile phone and wherein the access device is a mass transit terminal.

15. The user device of claim 9, wherein the determination of whether the linkage exists between the access device type identifier and the one or more application identifiers of the plurality of application identifiers stored on the user device is performed based in part on a feature of the user device.

16. The user device of claim 15, wherein the feature of the user device is an application stored on the user device, the application being configured to analyze the access device type identifier of the available applications request message.

17. A method comprising:
generating, by an access device prior to sending an application selection message to a user device, an available applications request message, wherein the available applications request message comprises a data field comprising a first application identifier (AID), the first application identifier comprising (1) a first registered application provider identifier (RID) comprising a proximity payment systems environment (PPSE) identifier, and (2) a first proprietary application identifier extension (PIX) comprising an access device type identifier, wherein the access device type identifier indicates that authentication data of a user associated with the user device is not needed prior to conducting a transaction via the access device;

transmitting, by the access device, the available applications request message to a user device, wherein the access device type identifier is used by the user device to determine not to prompt the user for the authentication data;

receiving, by the access device from the user device, an available applications response, the available applications response comprising one or more application identifiers of a plurality of application identifiers stored on the user device, each of the one or more application identifiers being selected by the user device based in part on being linked with the access device type identifier, and wherein the plurality of application identifiers respectively correspond to different applications on the user device;

sending, by the access device to the user device, the application selection message that indicates a selection of a particular application of the different applications on the user device; and transmitting, by the access device to the user device, one or more messages operable for completing a transaction involving the particular application on the user device.

18. The method of claim 17, wherein the access device type identifier is a string value of a set of predefined string values.

19. The method of claim 17, further comprising:
selecting, by the access device, an application identifier of the one or more application identifiers received from the user device; and
generating, by the access device, the application selection message comprising the selected application identifier.

20. The method of claim 19, wherein selecting is based in part on one or more application priority indicators received from the user device in the available applications response, the one or more application priority indicators respectively corresponding to different application identifiers of the one or more application identifiers.

21. The method of claim 17, further comprising:
receiving, by the access device from the user device, an error message indicating that the user device could not process the available applications request message, wherein the available applications request message is an enhanced available applications request message;
generating, by the access device, a second available applications request message, wherein the second available applications request message is a non-enhanced available applications request message; and
transmitting, by the access device, the second available applications request message to the user device.

22. A method according to claim 1, further comprising:
determining, by the user device, based in part on the access device type identifier, that user interaction on the user device is not necessary.

* * * * *